US012361734B2

(12) United States Patent
Wang et al.

(10) Patent No.: US 12,361,734 B2
(45) Date of Patent: Jul. 15, 2025

(54) METHOD FOR DETECTING IMAGE BY SEMANTIC SEGMENTATION

(71) Applicant: NATIONAL CHUNG CHENG UNIVERSITY, Chiayi County (TW)

(72) Inventors: Hsiang-Chen Wang, Chiayi (TW); Kuan-Lin Chen, Chiayi (TW); Yu-Ming Tsao, Chiayi County (TW); Jen-Feng Hsu, Tainan (TW)

(73) Assignee: National Chung Cheng University, Chiayi County (TW)

( * ) Notice: Subject to any disclaimer, the term of this patent is extended or adjusted under 35 U.S.C. 154(b) by 395 days.

(21) Appl. No.: 18/162,077

(22) Filed: Jan. 31, 2023

(65) Prior Publication Data

US 2023/0282010 A1 Sep. 7, 2023

(30) Foreign Application Priority Data

Mar. 4, 2022 (TW) .................................. 111108094

(51) Int. Cl.
| | |
|---|---|
| *G06F 17/00* | (2019.01) |
| *G06V 10/26* | (2022.01) |
| *G06V 10/75* | (2022.01) |
| *G06V 10/764* | (2022.01) |
| *G06V 10/77* | (2022.01) |
| *G06V 10/82* | (2022.01) |
| *G06V 20/70* | (2022.01) |

(52) U.S. Cl.
CPC .............. *G06V 20/70* (2022.01); *G06V 10/26* (2022.01); *G06V 10/751* (2022.01); *G06V 10/764* (2022.01); *G06V 10/7715* (2022.01); *G06V 10/82* (2022.01); *G06V 2201/03* (2022.01)

(58) Field of Classification Search
CPC .... G06V 20/70; G06V 10/7715; G06V 10/82; G06V 10/751; G06V 10/26; G06V 10/764; G06V 2201/03
See application file for complete search history.

(56) References Cited

U.S. PATENT DOCUMENTS

| | | | | |
|---|---|---|---|---|
| 10,445,881 | B2* | 10/2019 | Spizhevoy | .............. G06T 7/194 |
| 10,565,729 | B2* | 2/2020 | Vajda | ........................ G06T 7/75 |
| 10,922,393 | B2* | 2/2021 | Spizhevoy | .......... H04L 63/0861 |
| 11,107,232 | B2* | 8/2021 | Li | .......................... G06V 10/82 |
| 11,176,709 | B2* | 11/2021 | Pillai | ...................... G01B 11/22 |
| 11,257,252 | B2* | 2/2022 | Wen | ......................... G06T 9/00 |
| 11,386,583 | B2* | 7/2022 | Wen | ....................... G06F 17/15 |
| 11,461,998 | B2* | 10/2022 | Liu | ..................... G06F 18/2413 |
| 12,020,437 | B2* | 6/2024 | Cha | ........................ G06T 7/0004 |
| 12,167,031 | B1* | 12/2024 | Galvin | ..................... G01S 7/417 |
| 2020/0085382 | A1* | 3/2020 | Taerum | ................ A61B 5/7264 |
| 2020/0125852 | A1* | 4/2020 | Carreira | ................ G06N 3/049 |
| 2020/0218948 | A1* | 7/2020 | Mao | ...................... G06V 30/274 |
| 2021/0271847 | A1* | 9/2021 | Courtiol | ................. G06V 10/50 |

(Continued)

*Primary Examiner* — Mohammed H Zuberi
(74) *Attorney, Agent, or Firm* — Rosenberg, Klein & Lee

(57) ABSTRACT

The present application discloses a method for detecting image by using semantic segmentation. To input an image with data augmentation, and then encode and decode using a neural network. At least one semantically divided, and finally the at least one semantically divided is compared with the sample to classify as a target or a non-target. In this way, the CNN is used to detect whether the image is the SCC image or not, and locate the section, thereby assisting the doctor in interpreting the esophagus image.

10 Claims, 7 Drawing Sheets

(56) References Cited

U.S. PATENT DOCUMENTS

| | | | | |
|---|---|---|---|---|
| 2021/0279503 A1* | 9/2021 | Qi | ............... | G06F 18/2413 |
| 2021/0406582 A1* | 12/2021 | Wang | ............... | G06F 18/214 |
| 2022/0180199 A1* | 6/2022 | Xu | ............... | G06V 10/82 |
| 2022/0366682 A1* | 11/2022 | Cha | ............... | G06V 10/80 |
| 2023/0281818 A1* | 9/2023 | Wang | ............... | G06V 10/77 |
| | | | | 382/133 |

* cited by examiner

METHOD FOR DETECTING IMAGE BY SEMANTIC SEGMENTATION

FIELD OF THE INVENTION

The present application relates generally to a method for detecting image, and particularly to a method for detecting image by using semantic segmentation.

BACKGROUND OF THE INVENTION

Currently, it is common to diagnose diseases in the digestive system by using endoscopes as the tool. In particular, for esophageal cancer in the early stage, there are few symptoms. Most patients will not beware of the disease until swallowing problems occur. The diagnosis of clinical esophageal cancer is normally made by using esophagoscopes.

The esophagus is a tubular organ connecting the pharynx and the stomach with the main function of transporting the food swallowed from the oral cavity to the stomach. The mucosa of a normal esophagus includes multiple layers of squamous epithelial cells with thickness between 200 and 500 micrometers approximately. The layers from top to bottom include the epithelium (EP), the lamina propria mucosae (LPM), the muscularis mucosae (MM), the submucosa (SM), and the muscularis propria (VIP), respectively. Esophageal cancer is eighth of the most common cancer types worldwide. The malignant tumors originated from the epithelial tissues are called cancers. They generally will affect physiological functions and further include sarcoma, lymphoma, leukemia, melanoma, carcinosarcoma, and malignant glioma.

The malignant tumors occurring in connective tissues are called sarcoma. The connective tissues include fibrous tissues, fatty tissues, muscles, blood vessels, bones, and cartilages. In addition, lymphoma and leukemia occur in hematopoietic tissues. Melanoma occurs in skin cells. The malignant tumors occurring in epithelial tissues and connective tissues concurrently are called carcinosarcoma. Besides, malignant glioma is a malignant tumor occurring in neural tissues. Esophageal cancer permeates not only the epithelial tissues on an esophagus but also the connective tissues at late stage.

The present diagnosis technologies generally rely on single macroscopic data and information such as body temperature, blood pressure, or body scan images. For example, to detect major diseases such as cancers, current common instruments are mostly based on the image technologies, including X-ray, computer tomography (CT), and nuclear magnetic resonance (NMR) imaging technologies. When these diagnosis instruments are adopted in combination, they are useful in diagnosis in different levels. Unfortunately, when they are used individually, early, accurate, accountable, efficient, and economical detection of major diseases are not possible. Moreover, most of the instruments, such as the X-ray, CT, or NMR imaging technologies, are bulky and invasive. Accordingly, to observe the nidi in digestive organs, endoscopes are developed.

Moreover, it is difficult to detect esophageal cancer in the early stage. In addition to exhibiting almost no symptom, even an esophagoscopy examination is performed, some esophageal cancers in the early stage are not detected. Since the variation of the lesions are minute, usually only some minor color changes, if a traditional endoscopy is performed, many lesions of esophageal cancer in the early stage are ignored, resulting in delayed treatment. Accordingly, for indetectable lesions, the lugol chromoendoscopy, narrow-band imaging (NBI), and magnifying endoscopy are developed, as described in detail below. Endoscopes include:

White light imaging (WLI): This is a traditional endoscopy technology. White light is illuminated on mucosa tissues of esophagus. After reflection, the image in esophagus can be given. Unfortunately, the technology lacks the ability of highlighting lesions. Only lesions such the esophageal cancer in the end stage are visible. Consequently, other endoscopy technologies are developed to highlight the features in images and hence facilitating doctors' judgement.

Narrow-band imaging (NBI): NBI can highlight the variation of IPCL blood vessels. The selected the light of 415 nm or 540 nm is scattered and absorbed by blood vessels and tissues in cells. The hemoglobins in blood vessels absorb the blue light and the green light. The capillaries in shallow mucosa tissues appear brown while other larger blood vessels appear green. In comparison with the tradition WLI, the NBI is more advantageous.

Chromoendoscopy: In addition to replacing the light source, the dyeing technique is adopted to judge the location of lesions since cancers will change cells. Considering the risk of unintentional inhale, it should be particularly cautious while dyeing the esophagus. The lugol chromoendoscopy with iodine dyeing is generally adopted. By using the iodine solution, the glycogen will be dyed brown. Contrarily, cancer cells will convert glycogen into energy and hence will not be dyed, making the possible lesion location prominent. Further biopsy can be performed to confirm the observation. Nonetheless, iodine dyeing might lead to discomfort at chest as well as allergic reactions of patients.

Magnifying endoscopy (ME): Different from other endoscopy technologies, the ME magnifies the images while maintain the image quality using the variable focus technique for observing minute variation of lesions. If other image enhancement technologies, such the NBI, the stage can be classified according to the shape of the IPCL and the immersion level of cancers can be judged.

Unfortunately, the operation of endoscopes is very complicated. In addition to requiring a professional license for medical personnel to operate one, they need to operate the endoscope and identify lesions concurrently. Even the detection methods of endoscopy have been improved significantly, it is unavoidable that artificial errors might occur or the images are difficult to be identified.

Besides, for convenience and lowering discomfort of patients, newer endoscopes, such as capsule endoscopes, sacrifice the NBI functionality. They only have WLI functions. Thereby, the difficulty of judging images is increased for doctors.

Thereby, a method to improve the diagnosis process for esophageal cancer is required. The computer-aided diagnosis (CAD) has become a major role in biomedical researches. By using the CAD, doctors can judge the type of diseases and the regions of lesions more accurately. Applying convolutional neural networks to computer vision (CV) is in particular the major technology trend. The applications include:

1. Image classification: Images are classified and filtered by using the deep learning method. The emphasis is that an image includes only one classification type, even if the image contains multiple targets. Thereby, the application of simple image classification is not popular. However, since the accuracy for a single target is the highest in deep learning algorithm, in practice, the object detection method will be used first to find the target. Then the extracted image is narrowed for image classification. Thereby, for those application using object detection, the image classification method will be used as well.

2. Object detection: An image might contain one or multiple target. The targets might belong to different types. The algorithm can achieve two purposes: fine out the coordinates of the targets and identify the types of the targets. The applications of object identification are extensive, including human face identification or defect inspection in the manufacturing industry. In hospitals, X-ray and ultrasound are adopted to detect diseases at specific parts of a human body. The object detection method can be regarded as adding the function of location labels to image classification method. However, the coordinates of object identification are normally rectangular or square. It is not possible to sketch the edges of targets by knowing only the location of the targets. Consequently, in applications, it suffices to give the location of targets.

3. Semantic segmentation: The algorithm will identify each pixel in an image. In other words, different from object detection, the semantic segmentation can identify the boundary pixels of each target correctly. Simply put, the semantic segmentation is image classification in the pixel level; each pixel is classified individually. Of course, the model of this type of application requires a more powerful GPU and longer time of training. The general application is similar to object detection except that the semantic segmentation will be applied to finer image identification, such as the applications of sketching the boundaries of the target. While performing detection using the semantic segmentation, the input is generally an image and the output is also an image with the same size. In the output image, different colors will be used to sketch pixels of different types.

The detection for oral cancer usually requires judgement of existence of lesion only and the scope of the lesion. Thereby, it is very suitable to use the semantic segmentation method to judge the location and scope of lesions. Particularly, the semantic segmentation can sketch the lesion region, which is superior to boxing the lesion region as used in the object detection method. Accordingly, an object detection method using convolutional neural network is extremely desired.

To solve the above problems, the present application provides a method for detecting image by using semantic segmentation. A residual learning model of a neural network codes and decodes an input image to generate semantic segmentation blocks. The input image is segmented and classified as a target-object image or a non-target-object image for avoiding difficulty in artificial image identification. Accordingly, lesion regions can be labeled on images rapidly for further judgement by medical personnel.

SUMMARY

An objective of the present application is to provide a method for detecting image by using semantic segmentation. By using convolutional neural network, the dimension of the input image is reduced for multiple times for extracting features and then raised for multiple times for generating several semantic segmentation blocks and thus deducing the object-under-test image. Furthermore, by comparing the object-under-test-image with the sample image, the object-under-test image can be classified as a target-object image or a non-target-object image.

To achieve the above objective, the present application discloses a method for detecting image by using semantic segmentation. An image extraction unit of a host provides a first image. Perform data augmentation on the first image using a data augmentation function to generate a second image. Next, the host generates one or more semantic segmentation block according to a residual learning model of a neural network and an encoding-decoding method. The encoding-decoding method comprises steps of: generating a plurality of first pooling images from the second image using maximum pooling along a first contracting path; generating a plurality of second pooling images from the plurality of first pooling images using maximum pooling along a second contracting path; generating a plurality of third pooling images from the plurality of second pooling images using maximum pooling along a third contracting path; generating a plurality of fourth pooling images from the plurality of third pooling images using maximum pooling along a fourth contracting path; performing two or more layers of convolution calculations on the plurality of fourth pooling images along a first expansive path using a plurality of kernels after upsampling and concatenating the plurality of third pooling images for generating a plurality of first output images; performing two or more layers of convolution calculations on the plurality of first output images along a second expansive path using a plurality of kernels after upsampling and concatenating the plurality of second pooling images for generating a plurality of second output images; performing two or more layers of convolution calculations on the plurality of second output images along a third expansive path using a plurality of kernels after upsampling and concatenating the plurality of first pooling images for generating a plurality of third output images; performing two or more layers of convolution calculations on the plurality of third output images along a fourth expansive path using a plurality of kernels after upsampling and concatenating the second image for generating a fourth output image, the fourth output image including the one or more semantic segmentation block; the host comparing the one or more semantic segmentation block with a sample image and producing a comparison result if the comparison matches; and the host classifying the one or more semantic segmentation block as a target-object image according to the comparison result. Thereby, according to the present application, the host performs convolution to generate the semantic segmentation block. Then the semantic segmentation block is compared with the sample image for classifying the semantic segmentation block as a target-object image or a non-target-object image. Accordingly, automatic detection can be performed and the difficulty in detection can be avoided.

According to an embodiment of the present application, the maximum pooling includes a plurality of kernels with 2×2 kernel size.

According to an embodiment of the present application, the upsampling includes a plurality of deconvolution kernels with 2×2 kernel size.

According to an embodiment of the present application, the data augmentation function is the function ImageDataGenerator in a Keras library.

According to an embodiment of the present application, in the function ImageDataGenerator, rotation_range is set to 60; shear_range is set to 0.5; fill_mode is set to 'nearest'; and validation split is set to 0.1.

According to an embodiment of the present application, the neural network is U-NET.

According to an embodiment of the present application, in the step of an image extraction unit of a host extracting a first image, the image extraction unit extracts the first image and adjusts the first image to a default size.

According to an embodiment of the present application, in the step of an image extraction unit of a host extracting a first image, the image extraction unit extracts the first image of an esophagus. The examples of the first image include a white light image or a narrow-band image.

According to an embodiment of the present application, in the step of the host comparing the one or more semantic segmentation block with a sample image and producing a comparison result if the comparison matches, the host compares a plurality of feature values corresponding to each of the one or more semantic segmentation block with a plurality of feature values of the sample image. If the feature values match, a comparison result is produced.

According to an embodiment of the present application, in the step of the host classifying the one or more semantic segmentation block as a target-object image according to the comparison result, when the host detects matches between the plurality of feature values corresponding to each of the one or more semantic segmentation block and the plurality of feature values of the sample image, the host classifies the one or more semantic segmentation block as the target-object image. Otherwise, the host classifies the one or more semantic segmentation block as a non-target-object image.

DETAILED DESCRIPTION

In order to make the structure and characteristics as well as the effectiveness of the present application to be further understood and recognized, the detailed description of the present application is provided as follows along with embodiments and accompanying figures.

To solve the problems of artificial errors or difficulty in image identification caused by complicated endoscope operations according to the prior art, the present application provides a method for detecting image by using semantic segmentation to solve the above problems.

In the following, the properties and the accompanying system provided by the method for detecting image by using semantic segmentation according to the present application will be further illustrated.

Figure 1:
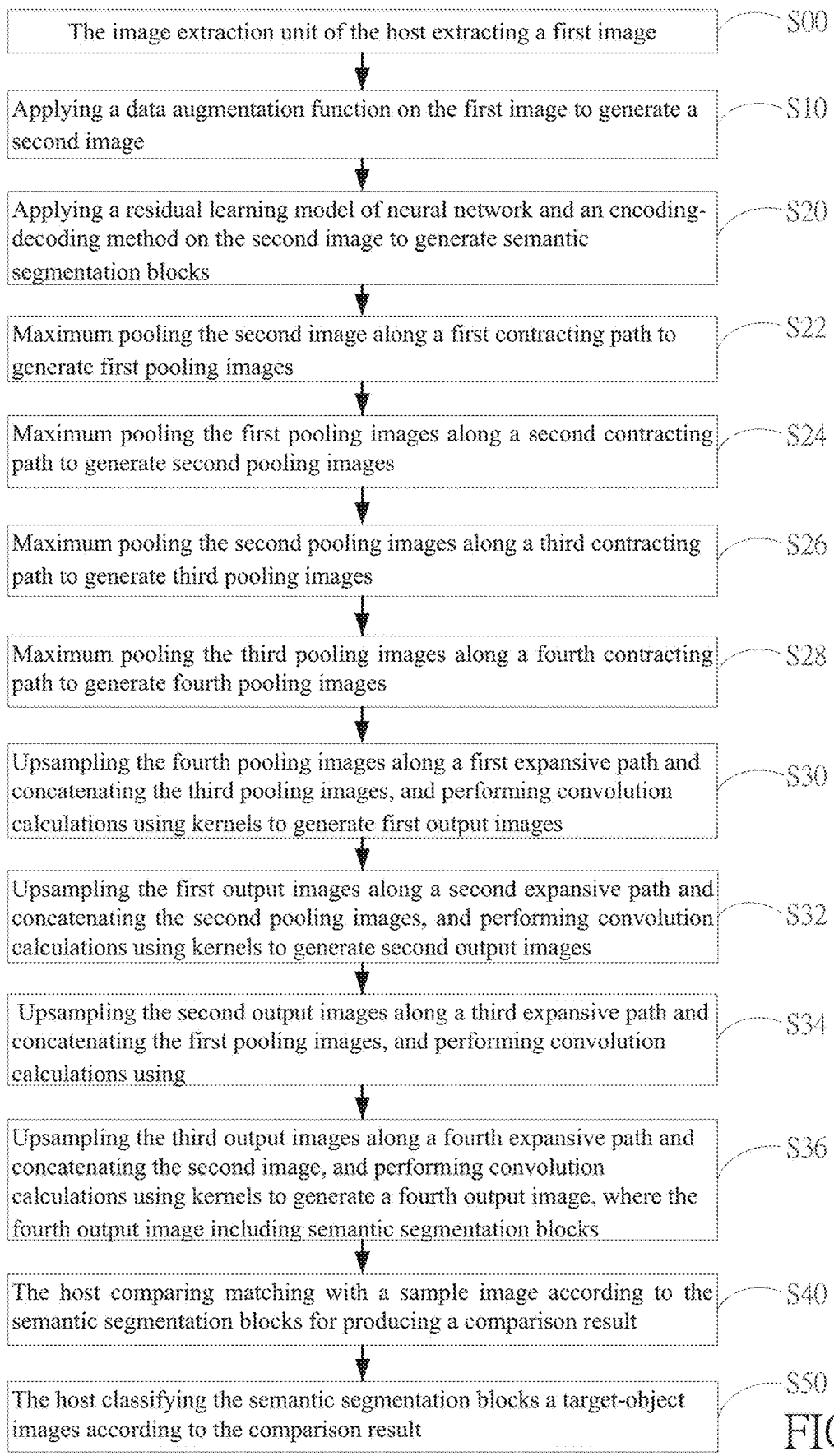
FIG. 1 shows a flowchart of convolutional image detection according to an embodiment of the present application.

First, please refer to FIG. 1, which shows a flowchart of the method according to an embodiment of the present application. As shown in the figure, the method for detecting image by using semantic segmentation according to the present application comprises steps of:

Step S00: The image extraction unit of the host extracting a first image;

Step S10: Applying a data augmentation function on the first image to generate a second image;

Step S20: Applying a residual learning model of neural network and an encoding-decoding method on the second image to generate semantic segmentation blocks;

Step S22: Maximum pooling the second image along a first contracting path to generate first pooling images;

Step S24: Maximum pooling the first pooling images along a second contracting path to generate second pooling images;

Step S26: Maximum pooling the second pooling images along a third contracting path to generate third pooling images;

Step S28: Maximum pooling the third pooling images along a fourth contracting path to generate fourth pooling images;

Step S30: Upsampling the fourth pooling images along a first expansive path and concatenating the third pooling images, and performing convolution calculations using kernels to generate first output images;

Step S32: Upsampling the first output images along a second expansive path and concatenating the second pooling images, and performing convolution calculations using kernels to generate second output images;

Step S34: Upsampling the second output images along a third expansive path and concatenating the first pooling images, and performing convolution calculations using kernels to generate third output images;

Step S36: Upsampling the third output images along a fourth expansive path and concatenating the second image, and performing convolution calculations using kernels to generate a fourth output image, where the fourth output image including semantic segmentation blocks;

Step S40: The host comparing matching with a sample image according to the semantic segmentation blocks for producing a comparison result; and Step S50: The host classifying the semantic segmentation blocks a target-object images according to the comparison result.

Please refer to FIG. 2A to FIG. 2D, which show the accompanying detection system 1 of the method for detecting image by using semantic segmentation according to the present application. The detection system 1 comprises a host 10 and an image extraction unit 20. According to the present embodiment, the host 10 is a computer including a processing unit 12, a memory 14, and a storage unit 16. Nonetheless, the present application is not limited to the embodiment. The host 10 can be a server, a notebook computer, a tablet computer, or any electronic device with calculation capability. A database 30 is built in, but not limited to, the storage unit 16. The database 30 can be built in an external storage unit of the host 10. The host 10 executes a convolution program 120 by the processing unit 12 and builds a neural network 124 correspondingly. In addition, according to the present embodiment, the image extraction unit 20 is an endoscope used for probing organs and tissue in human bodies, such as a cystoscope, a gastroscope, a colonoscope, a bronchoscope, or a laparoscope.

Figure 2A:
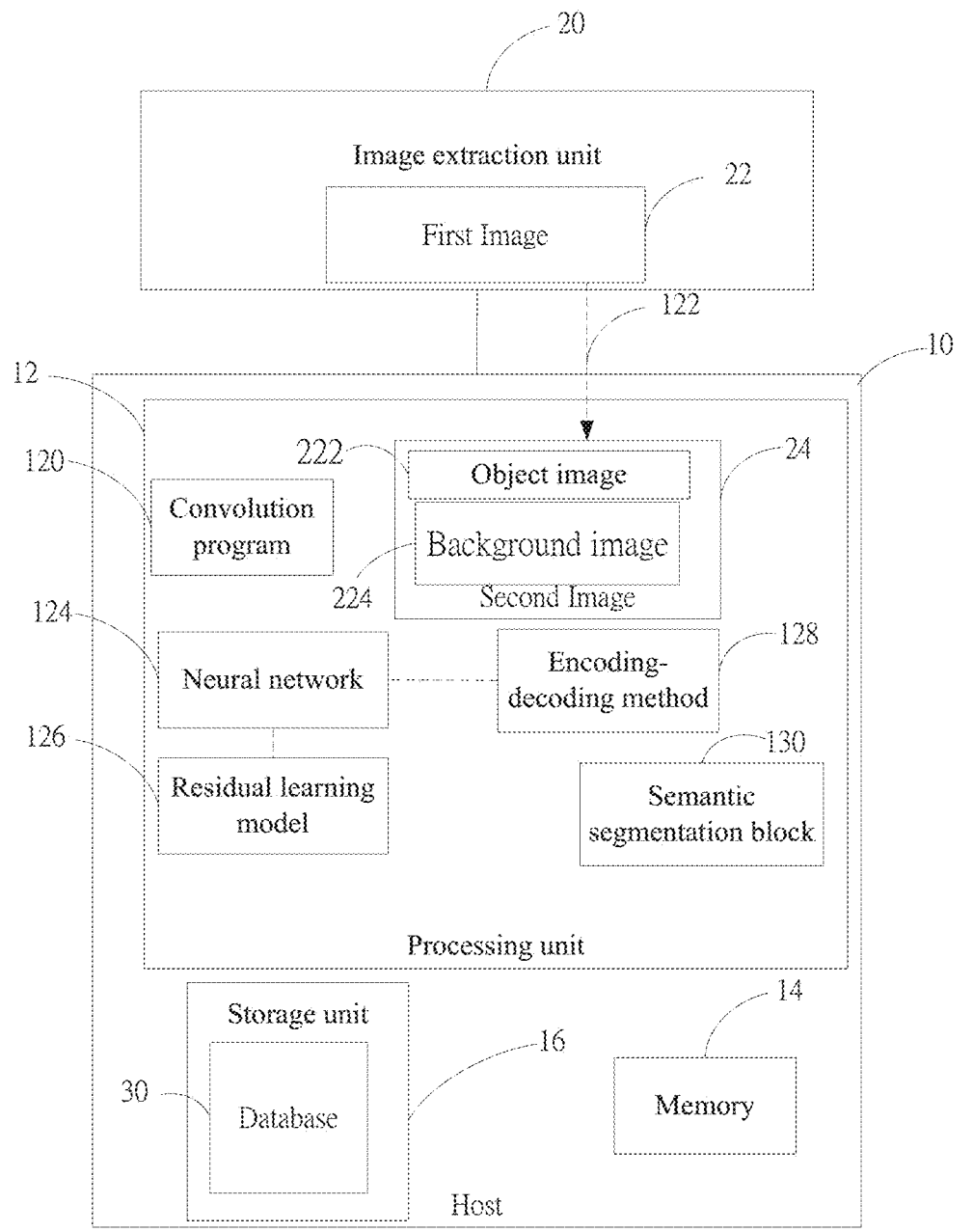
FIG. 2A to FIG. 2D show schematic diagram of partial steps according to an embodiment of the present application.

In the step S00, as shown in FIG. 2A, the host 10 reads a first image 22 of the image extraction unit 20. The first image 22 includes one or more object image 222 and a background image 224. The first image 22 can be a white light image (WLI) or a narrow-band image (NBI) stored in the database 30. The image extraction unit 20 according to the present embodiment acquires the corresponding white light image using the white light endoscope OLYMPUS EVIS LUCERA CV-260 SL and the corresponding narrow-band image using the narrow-band endoscope OLYMPUS EVIS LUCERA CLV-260. In other words, the one or more object image 222 and the background image 224 are stored in the white light image and the narrow-band image of the first image 22, respectively.

In the step S10, as shown in FIG. 2A, the processing unit 12 of the host 10 applies a data augmentation function 12 on the first image 22 to generate a second image 24. According to the present embodiment, the data augmentation function 122 is a high-level neural network API in Python. The function ImageDataGenerator in the Keras library is used as data augmentation for reinforcing identification rate of a convolutional neural network (CNN) when the data from the first image 22 is insufficient. This function includes rotation_range, shear_range, fill_mode, and validation split. rotation_range enables the input second image 24 rotates its angle randomly by inputting an integer for increasing data. shear_range uses an input floating-point number as the counterclockwise shear angle of the input second image 24. fill_mode sets the filling method to be one of 'constant', 'nearest', 'reflect', and 'wrap' when the input second image 24 exceeds the boundary during conversion. validation split reserves a ratio of the input second image 24 as the validation dataset by inputting a floating-point number when no validation dataset is available.

In the step S20, the host 10 applies a residual learning model 126 of the neural network 124 and an encoding-decoding method 128 on the second image to generate one or more semantic segmentation block 130. According to the present embodiment, the neural network 124 is a CNN; the residual learning model 126 is ResNet152v2, which is a backbone of CNN. The encoding-decoding method 128 includes the steps S22 to S36. Please refer to FIG. 2B and FIG. 2C as well.

Figure 2B:
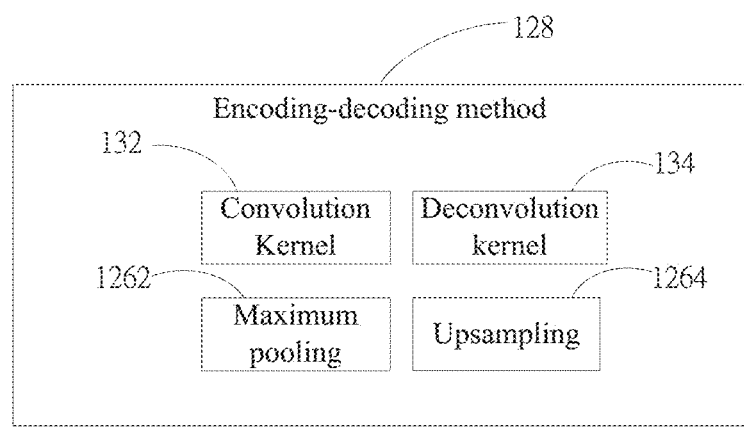
Figure 2C:
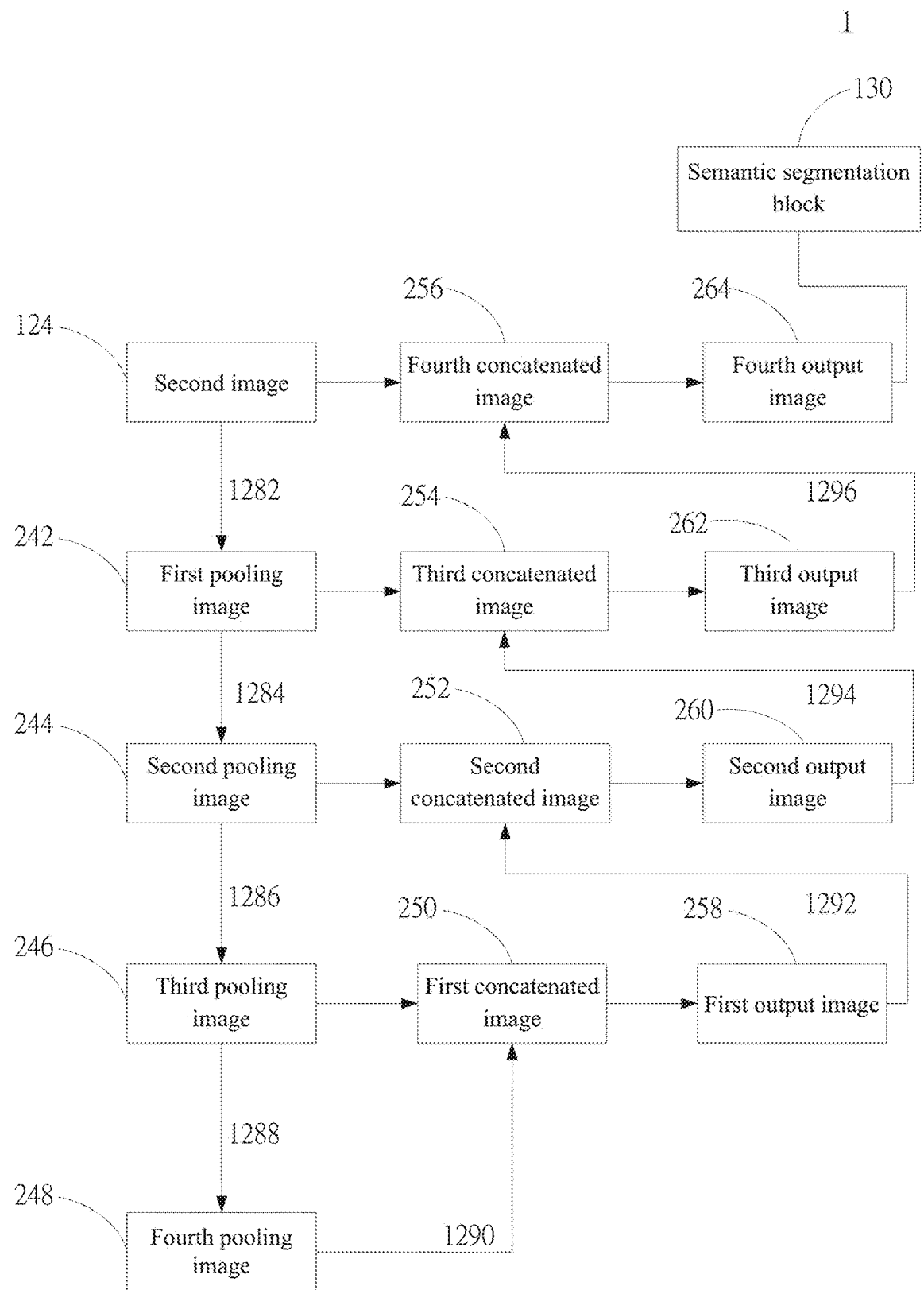

In the step S22, as shown in FIG. 2B and FIG. 2C, maximum pool 1262 the second image along a first contracting path 1282 to generate a plurality of first pooling images 242. As shown in equation (1), the maximum pooling 1262 is set to include a plurality of kernels 132 with 2×2 kernel size in the pooling layer. The second image 24 can be pooled via the plurality of kernels 132 with 2×2 kernel size to generate the plurality of first pooling images 242. The resolution of the second image 24 is 608×608; the resolution of the plurality of first pooling images 242 is 304×304. Compared with the second image 24, the resolution of the plurality of first pooling image 242 is halved.

$$\begin{bmatrix} 1 & 5 & 7 & 2 \\ 3 & 1 & 9 & 3 \\ 5 & 8 & 3 & 2 \\ 1 & 2 & 1 & 5 \end{bmatrix} \xrightarrow{kernel\ size:\ 2\times 2\ Max\ Pooling} \begin{bmatrix} 5 & 9 \\ 8 & 5 \end{bmatrix} \quad (1)$$

In the step S24, maximum pool 1262 the plurality of first pooling images 242 along a second contracting path 1284. The plurality of first pooling images 242 can be pooled via the plurality of kernels 132 with 2×2 kernel size to generate a plurality of second pooling images 244. As shown in equation (1), the resolution of the plurality of second pooling images 244 is 152×152. Compared with the plurality of first pooling images 242, the resolution of the plurality of second pooling image 244 is halved.

In the step S26, maximum pool 1262 the plurality of second pooling images 244 along a third contracting path 1286. The plurality of second pooling images 244 can be pooled via the plurality of kernels 132 with 2×2 kernel size to generate a plurality of third pooling images 246. As shown in equation (1), the resolution of the plurality of third pooling images 246 is 76×76. Compared with the plurality of second pooling images 244, the resolution of the plurality of third pooling image 246 is halved.

In the step S28, maximum pool 1262 the plurality of third pooling images 246 along a fourth contracting path 1288. The plurality of third pooling images 246 can be pooled via the plurality of kernels 132 with 2×2 kernel size to generate a plurality of fourth pooling images 248. As shown in equation (1), the resolution of the plurality of fourth pooling images 248 is 38×38. Compared with the plurality of third pooling images 246, the resolution of the plurality of fourth pooling image 248 is halved.

In the step S30, upsample 1264 the plurality of fourth pooling images 248 along a first expansive path 1290 by using a plurality of deconvolution kernels 134 with 2×2 kernel size. As shown in equation (2), after upsampling 1264, the resolution of the plurality of fourth pooling images 248 is doubled. Then the plurality of upsampled fourth pooling images 248 are concatenated with the plurality of third pooling images 246 to form a plurality of first concatenated images 250. Concatenation is a technique of feature fusion by merging channels. As shown in equation (3), the number of channels of the concatenated image is increased and hence increasing the number of a plurality of feature values 136 while maintain each of the plurality of feature values 136 and the resolution. Next, perform convolution calculations using the plurality of kernels 132 with kernel size 1×1 on the plurality of first concatenated images 250 to generate a plurality of first output images 258. The resolution of the plurality of first output images 258 is 76×76. Compared with the plurality of fourth pooling images 248, the resolution of the plurality of first output images 258 is doubled.

$$\begin{bmatrix} 5 & 9 \\ 8 & 5 \end{bmatrix} \xrightarrow{kernel\ size:\ 2\times 2\ Up\ Sampling} \begin{bmatrix} 5 & 5 & 9 & 9 \\ 5 & 5 & 9 & 9 \\ 8 & 8 & 5 & 5 \\ 8 & 8 & 5 & 5 \end{bmatrix} \quad (2)$$

$$\begin{bmatrix} 2 & 7 \\ 1 & 3 \end{bmatrix} \begin{bmatrix} 5 & 7 \\ 6 & 8 \end{bmatrix} \xrightarrow{concat} \begin{bmatrix} 2 & 7 & 5 & 7 \\ 1 & 3 & 6 & 8 \end{bmatrix} \quad (3)$$

In the step S32, upsample 1264 the plurality of first output images 258 along a second expansive path 1292 by using the plurality of deconvolution kernels 134 with 2×2 kernel size. As shown in equation (2), after upsampling 1264, the resolution of the plurality of first output images 258 is doubled. Then the plurality of upsampled first output images 258 are concatenated with the plurality of second pooling images 244 to form a plurality of second concatenated images 252. Next, perform convolution calculations using the plurality of kernels 132 with kernel size 1×1 on the plurality of second concatenated images 252 to generate a plurality of second output images 260. The resolution of the plurality of second output images 260 is 152×152. Compared with the plurality of first output images 258, the resolution of the plurality of second output images 260 is doubled.

In the step S34, upsample 1264 the plurality of second output images 260 along a third expansive path 1294 by using the plurality of deconvolution kernels 134 with 2×2 kernel size. As shown in equation (2), after upsampling 1264, the resolution of the plurality of second output images 260 is doubled. Then the plurality of upsampled second output images 260 are concatenated with the plurality of first pooling images 242 to form a plurality of third concatenated images 254. Next, perform convolution calculations using the plurality of kernels 132 with kernel size 1×1 on the plurality of third concatenated images 254 to generate a plurality of third output images 262. The resolution of the plurality of third output images 262 is 304×304. Compared with the plurality of second output images 260, the resolution of the plurality of third output images 262 is doubled.

In the step S36, upsample 1264 the plurality of third output images 262 along a fourth expansive path 1296 by using the plurality of deconvolution kernels 134 with 2×2 kernel size. As shown in equation (2), after upsampling 1264, the resolution of the plurality of third output images 262 is doubled. Then the plurality of upsampled third output images 262 are concatenated with the second image 24 to form a fourth concatenated images 256. Next, perform convolution calculations using the plurality of kernels 132 with kernel size 1×1 on the fourth concatenated images 256 to generate a fourth output image 264. The fourth output image 264 includes one or more semantic segmentation block 130. Each of the semantic segmentation block 130 corresponds to the plurality of feature values 136. The resolution of the fourth output image 264 is 608×608. Compared with the plurality of third output images 262, the resolution of fourth output image 264 is doubled.

Figure 2D:
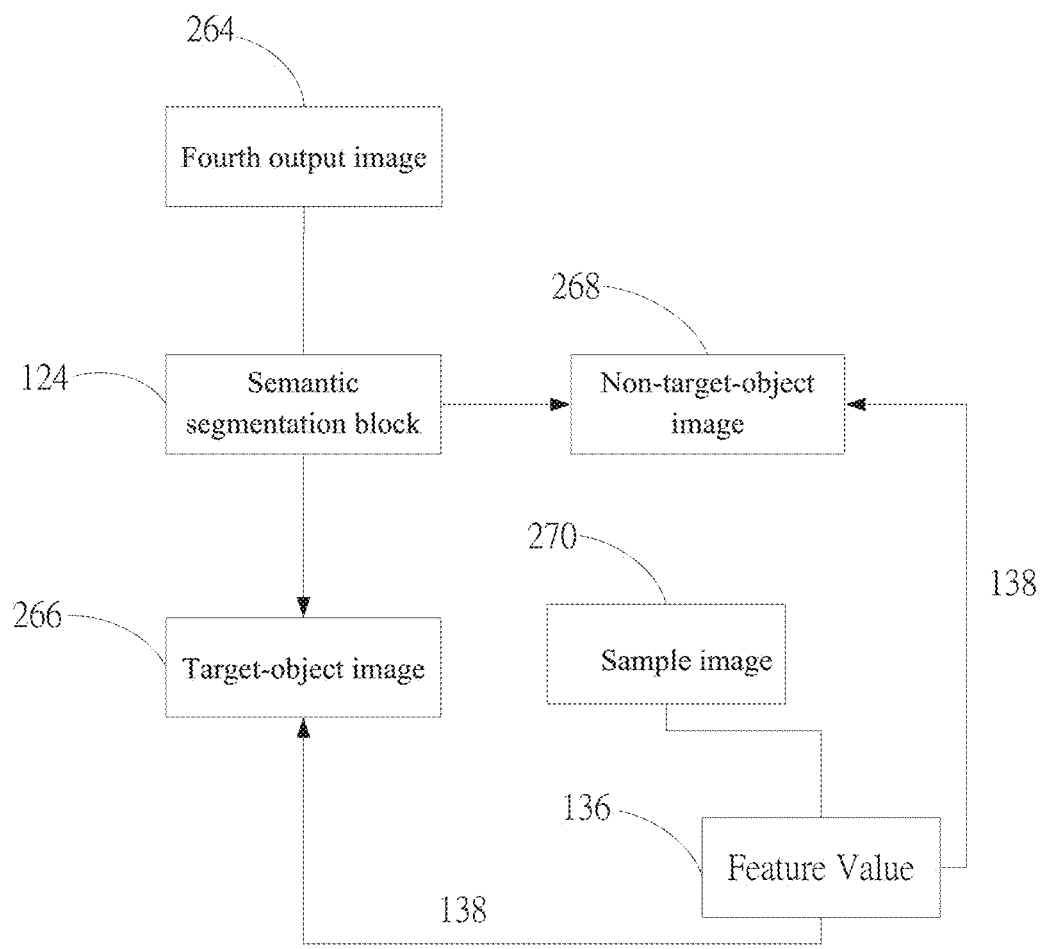

Please refer to FIG. 2D. In the step S40, after the processing unit 12 acquires the one or more semantic segmentation block 130, the host 10 compares the plurality of feature values 136 corresponding to each semantic segmentation block 130 with the plurality of feature values 136 corresponding to a sample image 270 and giving a comparison result 138. The sample image 270 is stored in the database 30. Next, in the step S50, the processing unit 12 of the host 10 executes the convolution program 120 and classifies each semantic segmentation block 130 as a target-object image 266 or a non-target-object image 268 according to the comparison result 138. An example of the target-object image 266 is a malignant tumor. When the convolution program 120 executed by the processing unit 12 of the host 10 detects matching between the plurality of feature values 136 corresponding to the one or more semantic segmentation block 130 and the plurality of feature values 136 corresponding to the sample image 270, the host 10 classifies the one or more semantic segmentation block 130 as the target-object image 266. Otherwise, the convolution program 120 executed by the processing unit 12 of the host 10 classifies the one or more semantic segmentation block 130 as the non-target-object image 268.

According to the present embodiment, a target-object image 266 can be an esophageal cancer (SCC) image 272 or a dysplasia image 274.

The present application provides a method for detecting image by using semantic segmentation. First, data augmentation is performed on the input image. Then a CNN is used to encode and decode the input image to give semantic segmentation blocks, which are further classified as target-object images or non-target-object images and thus identifying the input image. 165 results of judging and locating lesions in esophagoscope images using input images IMG with white light imaging (WLI) or with narrow-band imaging (NBI) are provided. By using semantic segmentation in WLI, the accuracy in normal regions is 86%; the accuracy in dysplasia regions is 89%; the accuracy in SCC regions is raised to 60%; and the overall accuracy is 79%. By using semantic segmentation in NBI, the accuracy in normal regions is 84%; the accuracy in dysplasia regions is 80%; the accuracy in SCC regions is raised to 78%; and the overall accuracy is 82%. Thereby, medical personnel can utilize the present application as supporting evidences for diagnoses.

Figure 3B:
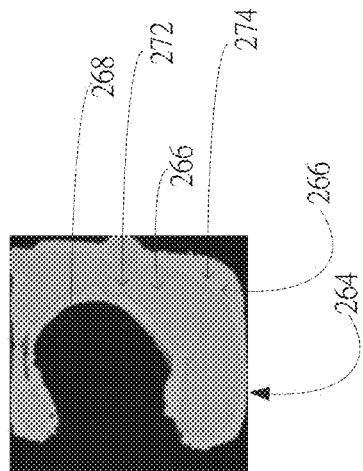
FIG. 3A to FIG. 3B show white light images using semantic segmentation according to an embodiment of the present application.
Figure 3A:
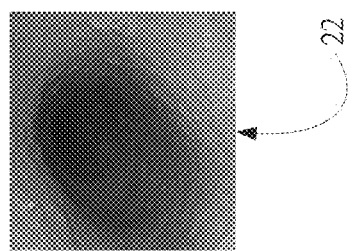
Figure 4B:
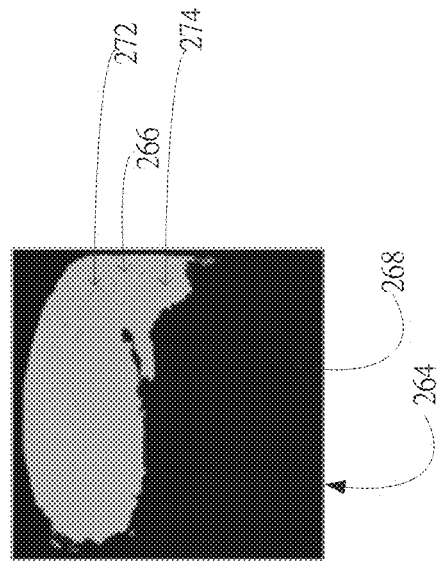
FIG. 4A to FIG. 4B show narrow-band images using semantic segmentation according to an embodiment of the present application.
Figure 4A:
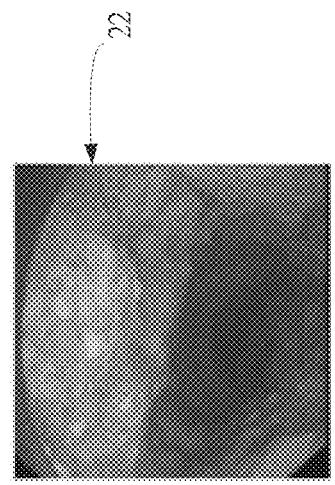

FIGS. 3A, 3B, 4A, and 4B show images according to embodiments of the present application. WLI or NBI esophagoscope images are used to detect esophageal cancers. The host 10 extracts the first image 22. Perform data augmentation using the data augmentation function 122 on the first image 22 to give the second image 24. The first image 22 and the second image 24 include one or more object image 222 and the background image 224. The residual learning model 126 of the neural network 124 use the encoding-decoding method 128 to process the second image 24 and giving the one or more semantic segmentation blocks. The one or more semantic segmentation blocks includes the plurality of feature values 136. Compare the plurality of feature values 136 of each semantic segmentation block 130 with the plurality of feature values 136 of the sample image 270 to give the comparison result 138. Each semantic segmentation block 130 is classified as the target-object image 266 or the non-target-object image 268. The first image 22 in FIG. 3A is WLI; the first image 22 in FIG. 4A is NBI. FIG. 3B and FIG. 4B are the one or more semantic segmentation image block 130 using the method according to the present application. The lesion (the target-object image 266) in the first image 22 is apparent. In FIG. 4B, the dysplasia image 277 can be even distinguished from the serious SCC image 274. The detectivity of the first image 22 and the contrast with respect to the non-target-object image 268 are improved, which facilitates easier observation of lesions by medical personnel.

To sum up, the present application provides a method for detecting image by using semantic segmentation. A residual learning model of a neural network codes and decodes an input image to generate semantic segmentation blocks. The input image is segmented and classified as a target-object image or a non-target-object image for avoiding difficulty in artificial image identification. Accordingly, lesion regions can be labeled on images rapidly for further judgement by medical personnel.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

What is claimed is:

1. A method for detecting image by using semantic segmentation, comprising steps of:
   an image extraction unit of a host extracting a first image;
   said host performing data augmentation on said first image using a data augmentation function to generate a second image;
   said host generating one or more semantic segmentation block according to a residual learning model of a neural network and an encoding-decoding method, and said encoding-decoding method comprising steps of:
   generating a plurality of first pooling images from said second image using maximum pooling along a first contracting path, said maximum pooling performing dimension reduction on said second image for extracting a plurality of feature values, and the resolution of said second image is halved after pooling;

generating a plurality of second pooling images from said plurality of first pooling images using maximum pooling along a second contracting path, said maximum pooling performing dimension reduction on said plurality of first pooling images for extracting said plurality of feature values, and the resolution of said plurality of first pooling images is halved after pooling;

generating a plurality of third pooling images from said plurality of second pooling images using maximum pooling along a third contracting path, said maximum pooling performing dimension reduction on said plurality of second pooling images for extracting said plurality of feature values, and the resolution of said plurality of second pooling images is halved after pooling;

generating a plurality of fourth pooling images from said plurality of third pooling images using maximum pooling along a fourth contracting path, said maximum pooling performing dimension reduction on said plurality of third pooling images for extracting said plurality of feature values, and the resolution of said plurality of third pooling images is halved after pooling;

performing two or more layers of convolution calculations on said plurality of fourth pooling images along a first expansive path using a plurality of kernels after upsampling and concatenating said plurality of third pooling images for generating a plurality of first output images, said upsampling locating said plurality of feature values and doubling the resolution of said plurality of fourth pooling images, and said two or more layers of convolution calculations reducing the increased channel number after concatenation;

performing two or more layers of convolution calculations on said plurality of first output images along a second expansive path using a plurality of kernels after upsampling and concatenating said plurality of second pooling images for generating a plurality of second output images, and said upsampling locating said plurality of feature values and doubling the resolution of said plurality of first output images;

performing two or more layers of convolution calculations on said plurality of second output images along a third expansive path using a plurality of kernels after upsampling and concatenating said plurality of first pooling images for generating a plurality of third output images, and said upsampling locating said plurality of feature values and doubling the resolution of said plurality of second output images; and performing two or more layers of convolution calculations on said plurality of third output images along a fourth expansive path using a plurality of kernels after upsampling and concatenating said plurality of second pooling images for generating a fourth output images, said fourth output image including said one or more semantic segmentation block, said upsampling locating said plurality of feature values and doubling the resolution of said plurality of third output images, and the resolution of said fourth output image equal to the resolution of said second image;

said host comparing said one or more semantic segmentation block with a sample image and producing a comparison result if the comparison matches; and said host classifying said one or more semantic segmentation block as a target-object image according to said comparison result.

2. The method for detecting image of claim 1, wherein said maximum pooling includes a plurality of kernels with 2×2 kernel size.

3. The method for detecting image of claim 1, wherein said upsampling includes a plurality of deconvolution kernels with 2×2 kernel size.

4. The method for detecting image of claim 1, wherein said data augmentation function is the function ImageDataGenerator in a Keras library.

5. The method for detecting image of claim 4, wherein in said function ImageDataGenerator, a rotation_range is set to 60; a shear_range is set to 0.5; a fill_mode is set to 'nearest'; and a validation_split is set to 0.1.

6. The method for detecting image of claim 1, wherein said neural network is U-NET.

7. The method for detecting image of claim 1, wherein said step of an image extraction unit of a host extracting a first image, said image extraction unit extracts said first image and adjusts said first image to a default size.

8. The method for detecting image of claim 1, wherein said step of an image extraction unit of a host extracting a first image, said image extraction unit extracts said first image and examples of said first image include a white light image or a narrow-band image.

9. The method for detecting image of claim 1, wherein said step of said host comparing said one or more semantic segmentation block with a sample image and producing a comparison result if the comparison matches, said host compares a plurality of feature values corresponding to each of said one or more semantic segmentation block with a plurality of feature values of said sample image; and if said feature values match, a comparison result is produced.

10. The method for detecting image of claim 1, wherein said step of said host classifying said one or more semantic segmentation block as a target-object image according to said comparison result, when said host detects matches between said plurality of feature values corresponding to each of said one or more semantic segmentation block and said plurality of feature values of said sample image, said host classifies said one or more semantic segmentation block as said target-object image; otherwise, said host classifies said one or more semantic segmentation block as a non-target-object image.

* * * * *